(12) United States Patent
Hornby (10) Patent No.: US 10,809,407 B2
(45) Date of Patent: Oct. 20, 2020

(54) ELECTRICAL JUNCTION BOX POSITIONING TOOL

(71) Applicant: Richmond Hornby, Upton, MA (US)

(72) Inventor: Richmond Hornby, Upton, MA (US)

( * ) Notice: Subject to any disclaimer, the term of this patent is extended or adjusted under 35 U.S.C. 154(b) by 210 days.

(21) Appl. No.: 16/142,852

(22) Filed: Sep. 26, 2018

(65) Prior Publication Data

US 2020/0096664 A1    Mar. 26, 2020

(51) Int. Cl.
| | |
|---|---|
| *G01B 5/14* | (2006.01) |
| *G01V 3/08* | (2006.01) |
| *B43K 29/08* | (2006.01) |
| *H02G 3/08* | (2006.01) |

(52) U.S. Cl.
CPC .............. *G01V 3/08* (2013.01); *B43K 29/08* (2013.01); *H02G 3/08* (2013.01)

(58) Field of Classification Search
CPC ...................................... B25H 7/00
USPC .............................. 33/528, DIG. 10
See application file for complete search history.

(56) References Cited

U.S. PATENT DOCUMENTS

| | | | | | |
|---|---|---|---|---|---|
| 3,954,717 | A | * | 5/1976 | Tarr ................. | B25B 11/02 269/82 |
| 5,222,303 | A | * | 6/1993 | Jardine ............. | G01B 3/02 33/528 |
| 5,860,219 | A | * | 1/1999 | Wilkinson .......... | H02G 1/00 33/528 |
| 6,233,838 | B1 | * | 5/2001 | Falwell ............. | H02G 3/126 269/904 |
| 6,463,668 | B1 | * | 10/2002 | Williams ........... | B25H 7/04 33/528 |
| 7,210,241 | B1 | * | 5/2007 | Bree ................ | B25H 7/04 33/528 |
| 7,454,844 | B1 | * | 11/2008 | Ruby ............... | H02G 1/00 33/528 |
| 10,668,582 | B1 | * | 6/2020 | Rogers ............. | B25B 5/02 |
| 2004/0035015 | A1 | * | 2/2004 | O'Connor .......... | H02G 1/00 33/528 |
| 2006/0265893 | A1 | * | 11/2006 | Gifford ............. | H02G 3/126 33/528 |
| 2007/0277388 | A1 | * | 12/2007 | Murphy ............ | H02G 3/123 33/528 |
| 2009/0277028 | A1 | * | 11/2009 | Dunn ............... | G01B 3/14 33/528 |
| 2010/0037475 | A1 | * | 2/2010 | Guzallis ........... | H02G 1/00 33/528 |
| 2012/0096724 | A1 | * | 4/2012 | Eyermann .......... | G01B 3/00 33/354 |

(Continued)

*Primary Examiner* — George B Bennett
(74) *Attorney, Agent, or Firm* — Robert Schuler (57) ABSTRACT

A tool for locating the position of an electrical junction box on a finished wall surface has a vertical support beam to which is attached a junction box position marking mechanism. When in use, the support beam rests upon a floor surface that is proximate to the wall and the marking mechanism can be forced into contact with the wall surface leaving an imprint that can be later used as a guide to position an electrical junction box. The marking mechanism can be connected to the support beam in a manner that permits it to be adjusted along the length of the support beam. Alternatively, the marking mechanism can be comprised of a template that serves as a guide for the operator to trace a line around at least a portion of the circumference of the interior opening of the template.

13 Claims, 7 Drawing Sheets

(56) References Cited

U.S. PATENT DOCUMENTS

| | | | |
|---|---|---|---|
| 2012/0186094 A1* | 7/2012 | Cornelius | H02G 1/00 |
| | | | 33/528 |
| 2014/0223753 A1* | 8/2014 | Yaphe | F21S 8/026 |
| | | | 33/566 |
| 2017/0224072 A1* | 8/2017 | Van Varick | A45B 1/00 |

* cited by examiner

FIG. 1 — ELECTRICAL JUNCTION BOX POSITIONING TOOL 100

FIG. 2

ELECTRICAL JUNCTION BOX POSITIONING TOOL 100

FIG. 4  ELECTRICAL JUNCTION BOX POSITIONING TOOL 100

FIG. 7 SPRING LOADED MARKING MECHANISM-SIDE VIEW

ELECTRICAL JUNCTION BOX POSITIONING TOOL

FIELD OF THE INVENTION

The present disclosure relates to tools used to mark a position at which an electrical junction box or plate is mounted to a finished wall.

BACKGROUND

Electrical junction boxes are used to provide a safe enclosure in which to make electrical connections between electrically conductive wires typically disposed in a wall cavity and light switches, electrical outlets and computer or communication network connections for example. Such junction boxes are designed and rated to be used for applications requiring higher or lower voltage levels. Typically, the junction boxes are positioned on and attached to a wooden or metal stud at a particular height prior to a wall being finished with some covering material such as plaster board or other sheet material. However, in the event that there is a requirement to position junction boxes on a wall that has already been finished, the process for locating a wooden or metal stud behind the finished wall and then locating a position for the box prior to a hole being cut in the finished wall can be a time-consuming process, especially if tens or hundreds of junction boxes need to be positioned.

3. BRIEF DESCRIPTION OF THE DRAWINGS

FIG. 4 shows the tool of FIG. 1 having a level and stud finder.

4. DETAILED DESCRIPTION

In lieu of the problems associated with quickly, accurately and consistently locating a position for an electrical junction box next to a stud in a wall that is already finished, I have designed an electrical junction box positioning tool that overcomes all of these problems. This electrical junction box positioning tool has functionality for locating a wooden or metal stud behind a finished wall, and it has a mechanism that can be operated with one hand to mark a position of an electrical junction box next to the stud at a consistent, selected vertical height with respect to a floor or other horizontal surface. The vertical position of the junction box position marking mechanism with respect to a horizontal surface can be easily adjusted and the marking mechanism can be securely attached to the tool. Several embodiments of the electrical junction box positioning tool, hereinafter referred to simply as the "tool" will now be described below with reference to the Figures, in which FIG. 1 illustrates the functional elements comprising the Tool 100.

Figure 1:
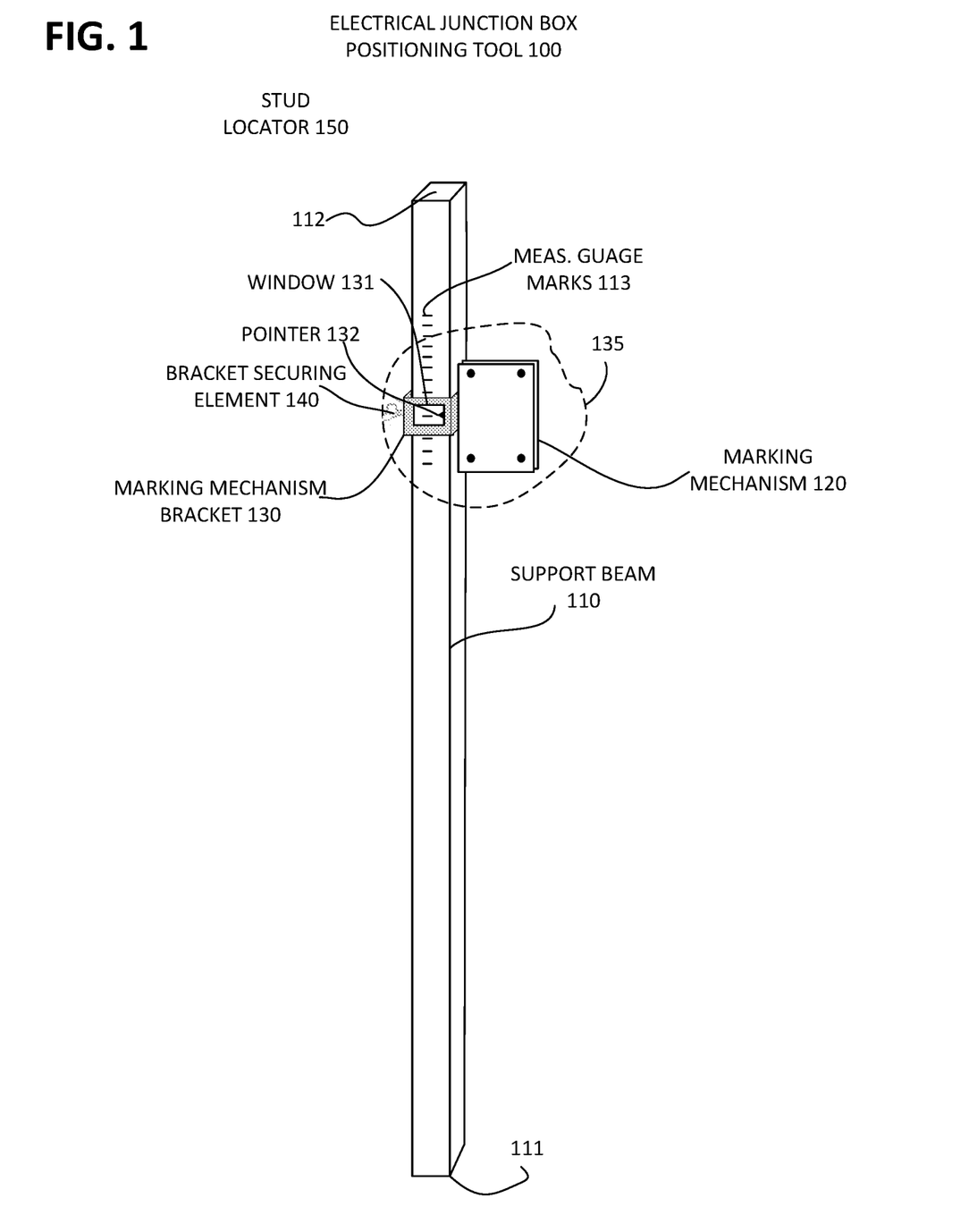
FIG. 1 is a perspective view of an electrical junction box positioning tool embodiment having a vertically adjustable junction box position marking mechanism.

The Tool 100 illustrated in FIG. 1 is comprised of a vertical support beam 110, a junction box position marking mechanism 120 that is attached to an adjustable mounting bracket 130, which in turn is secured to the beam 110 with a securing element 140. The beam 110 has a proximal end 111, that can rest upon a surface such as a floor, and it has a distal end 112. A beam length can be any dimension that allows the marking mechanism 120 to be adjusted to mark any standard junction box wall position height, and a cross-section geometry of the beam 110 can be square, round, rectangular or any other convenient geometry for attaching the marking mechanism and the stud locator or for attaching optional accessories which will be described later. One side of the support beam facing a wall surface can have incorporate a soft material so that the surface of the wall is not damaged during the process of marking a junction box position. The combination of the marking mechanism 120 and the bracket 130 comprises an adjustable marking assembly 135 that can be moved toward the proximal or distal ends along the length of the support beam 110 as needed to adjust the height of the marking mechanism above a surface (i.e., a floor) upon which the tool 100 rests, and the beam 110 can have ruled markings 113 that represent a distance from the proximal end of the support beam to a current position of the marking mechanism, and which can be applied to a surface of the support beam that can be used to determine a position (in metric or U.S. standard measure) of the marking mechanism 120 above a floor or other surface.

Continuing to refer to FIG. 1, a surface of the bracket 130 can have a window 131 and a pointer 132 that allows the tool user to view the marks 113 to determine the height of the marking mechanism 120. The marking mechanism 120 can be removably attached to the bracket 130, and it can be of any appropriate size and shape that corresponds with the junction box type for which a position is to be marked. Multiple different sizes and shapes of marking mechanisms (i.e., single gang or multiple gang junction boxes) can be easily attached to and removed from the mounting bracket 130 by any convenient mechanical means. The mechanism 120 can be attached to the bracket 130 by means of Velcro, it can be attached with a screw or bolt, it can be attached by a press fit (male-female connector) arrangement, it can be magnetically attached, or any other type of attachment means. Alternatively, the marking mechanism 120 can be rotatably attached to the bracket 130 such that the marking mechanism can be rotated clockwise or counter-clockwise with respect to a vertical orientation of the tool 100. Mounting the marking mechanism to the bracket so that it can rotate permits the tool to be used all a wall having baseboard heating, for example. The mounting bracket 130 is shown in FIG. 1 to completely surround the beam 110, and it can be moved vertically in an upward or downward direction with respect to the proximal end of the beam, and the bracket position can be secured with respect to the beam by a thumb screw, for example, or by any other securing means. In one embodiment, the bracket does not need to completely surround the beam 110, but can have an opening on a side of the beam opposing the marking mechanism, for example. According to another embodiment, the bracket 130 can be connected to a vertical groove (not shown) in the beam 110 by a male element protruding from the bracket in a female/male connection arrangement. In another embodiment a vertical position of the bracket 130 with respect to the beam 110 is maintained by a frictional type interface between the surface of the bracket that comes into contact with the beam 110 and the surface of the beam.

Figure 2:
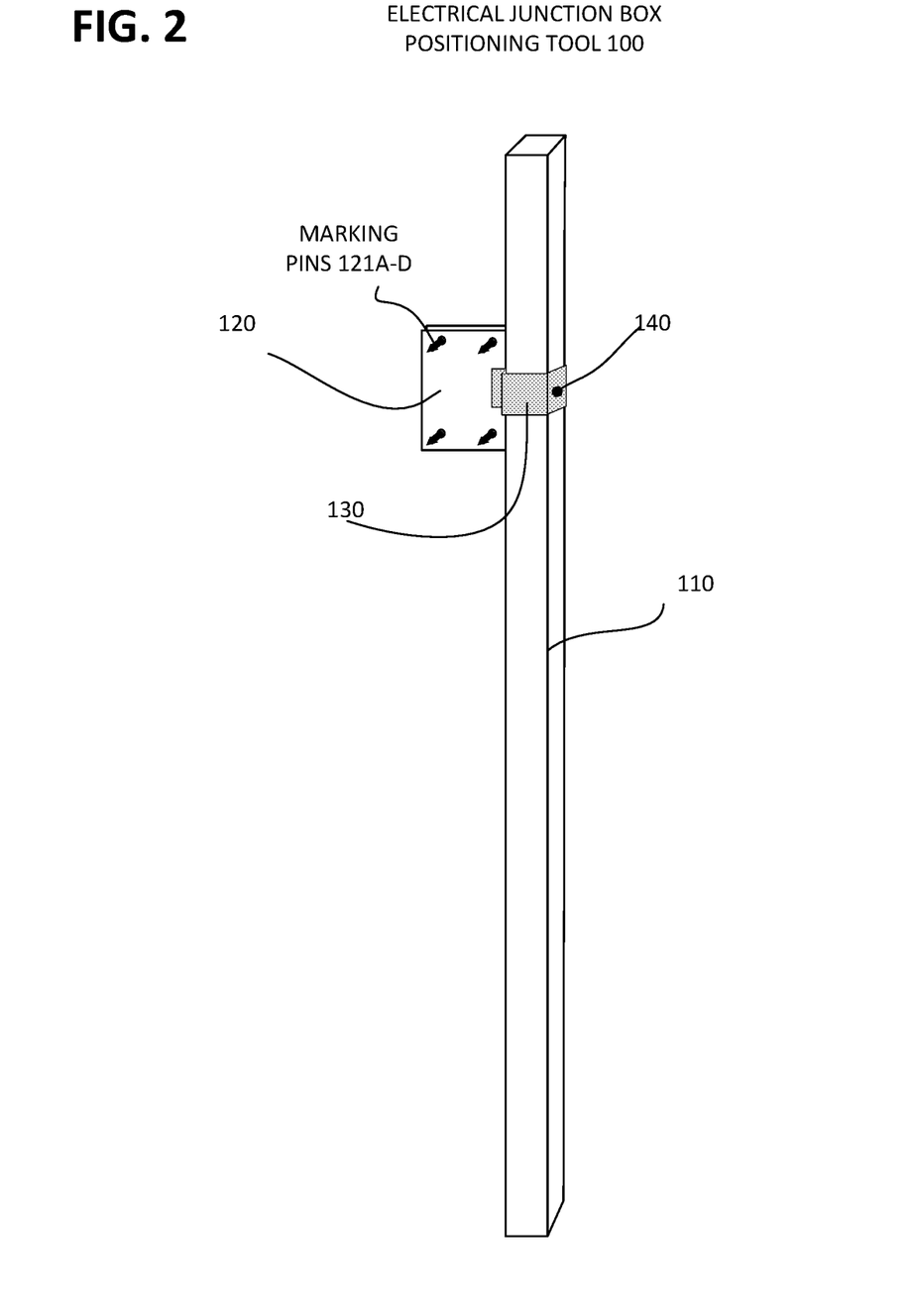
FIG. 2 shows a view of a reverse side of the junction box in FIG. 1

Continuing to refer to FIG. 1, the electrical junction box positioning tool 100 can be comprised of one or more materials that have the necessary strength and weight to perform the electrical junction box position location and marking task. The beam 110 can be composed of a wooden material, plastic material or metallic material. The beam can be solid or hollow in cross-section depending upon the material being used and weight considerations. The marking mechanism 120 can be composed of metal, plastic, or any other relatively rigid material, and the mechanism can be comprised of only immobile elements or it can be comprised of movable elements or a combination of the two, and the mechanism can be operated to mark the position of a junction box on a finished as will be describe later with reference to FIGS. 6A and 6B. The bracket 130 that servers to secure the marking mechanism 120 to the beam 110 can be composed of any relatively rigid material such as plastic or metal, FIG. 2 is a view of the tool 100 described with reference to FIG. 1 that has been rotated 180° around an axis running vertically from the proximal end 111 to the distal end 112 of the support beam 110 comprising the tool 100. This view shows all of the functional elements illustrated in FIG. 1, and additionally shows four marking elements 121A-121D attached to a movable plate and protruding through holes in a stationary plate comprising the marking mechanism 121. When the tool is placed proximate to a finished wall and the movable plate is depressed, the marking elements make a depression on the wall surface that marks a position for a junction box. More specifically, when in use the marking assembly 135 is adjusted to an appropriate height (i.e., the appropriate height can be a specified height, or the height can be determined by adjusting the marking tool height conform to the height of an existing junction box), and the tool 100 is moved to be proximate to a finished wall on which junction boxes need to be installed. As the tool is moved along the wall, the operator determines that the marking mechanism 120 is next to a wall stud and depresses the movable plate comprising the marking mechanism 120 towards the wall. The marking elements 121A-121D strike the wall and depending upon the force with which the movable plate is depressed the marking elements leave a smaller or larger depression that is an indication of a junction box position. According to the embodiments described with reference to FIGS. 1 and 2, the tool operator can locate a wall stud empirically by tapping on the wall surface to detect either a hollow or solid sound, and then move the marking mechanism 120 the necessary distance to either side of the stud before marking the wall.

Figure 3:
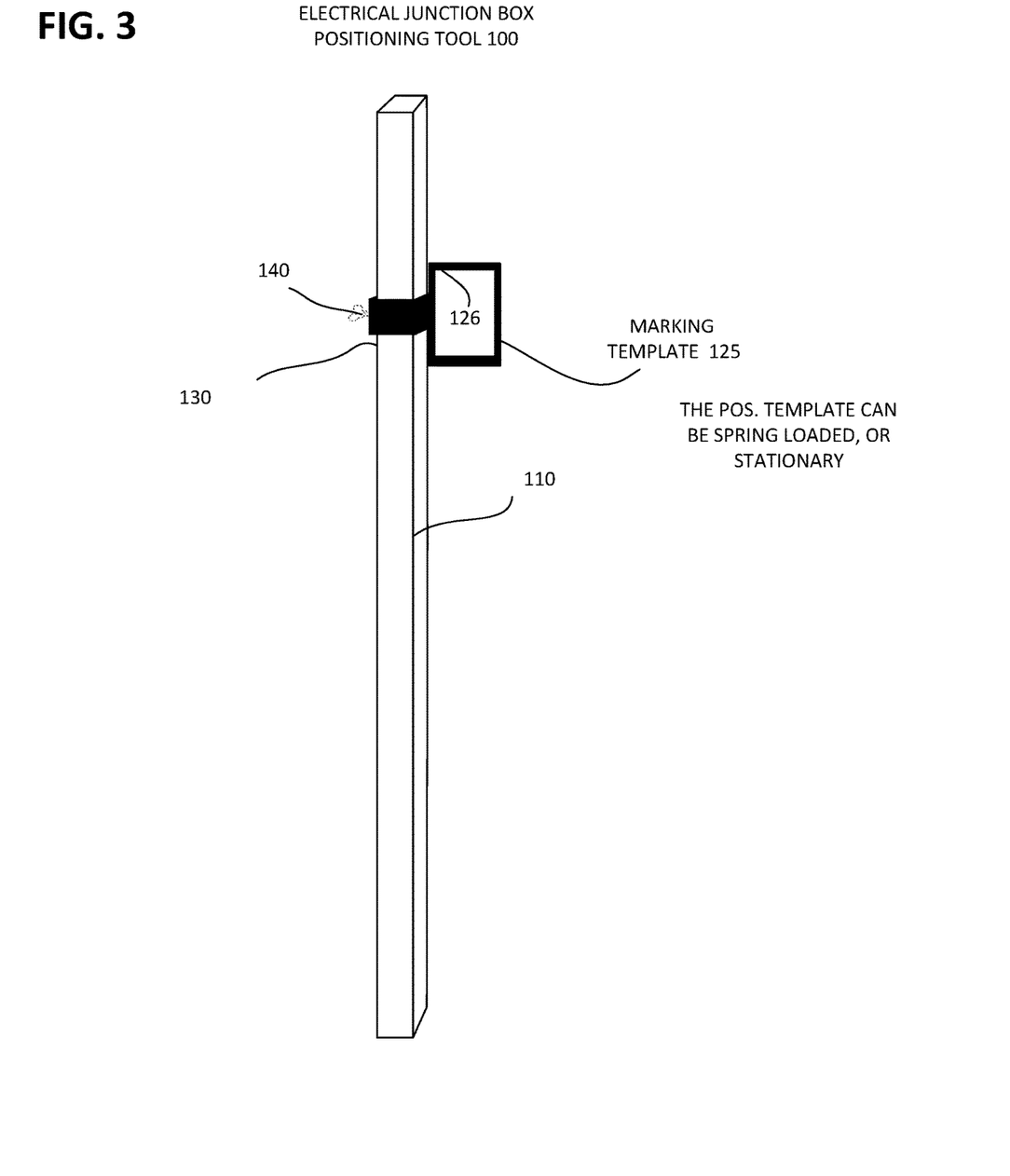
FIG. 3 illustrates another embodiment of the tool shown in FIG. 1.

FIG. 3 is a diagram illustrating the same tool 100 illustrated with reference to FIGS. 1 and 2, but with a marking template 125 instead of a marking mechanism 120. The template 125 is attached to the same bracket 130 which is in turn movably attached to the same beam 110 as described earlier. The template 125 serves as a guide for the operator to use a marking pencil or pen or some sort to trace a line around the entire or a portion of the circumference 126 of the interior opening of the template. While several marking mechanism embodiments are described here in the Figures, it should be understood that the tool 100 design is not limited to the marking mechanism embodiments described herein.

Figure 4:
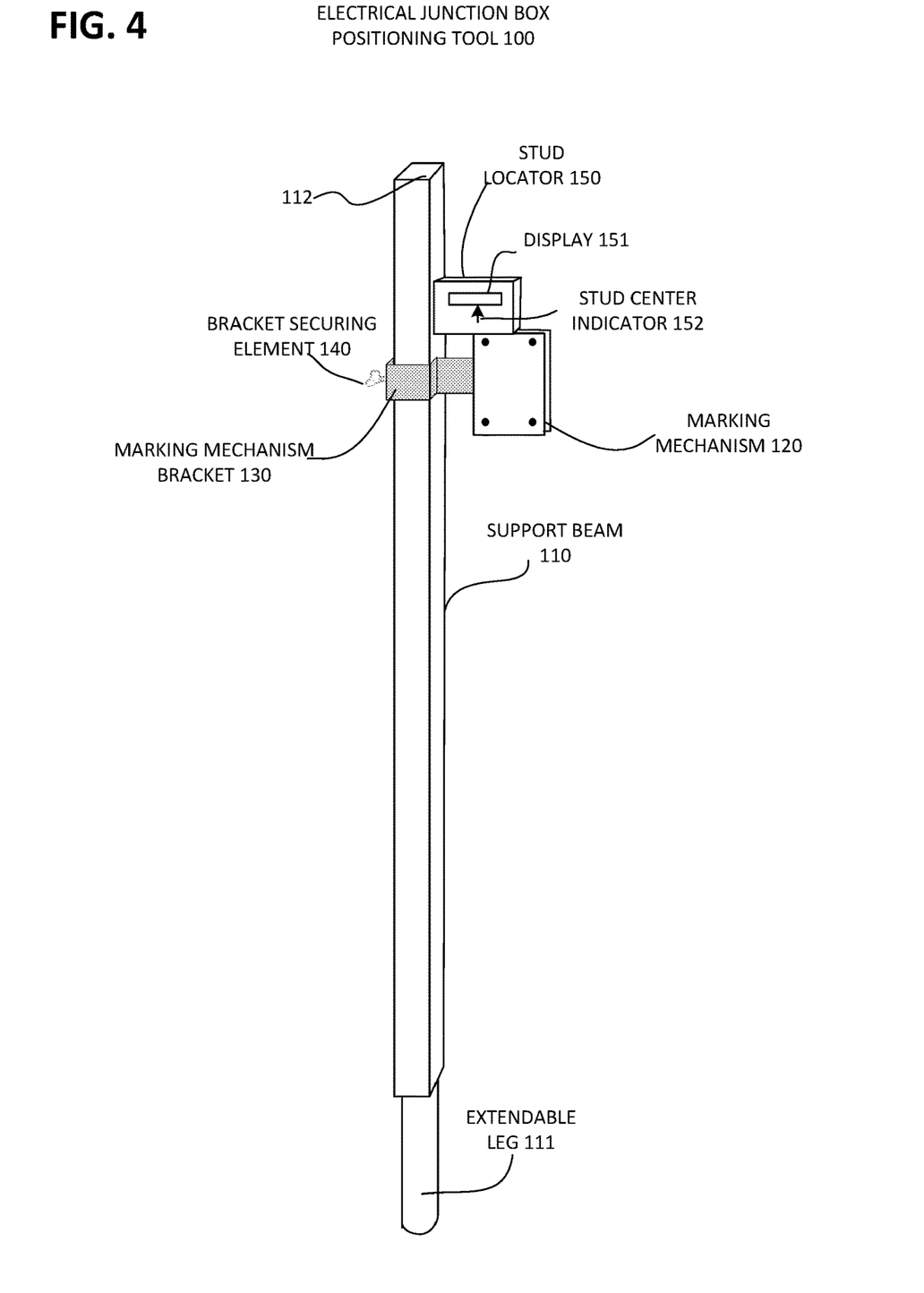
FIG. 4 illustrates an embodiment of the tool in FIG. 1 having an extendable leg.

FIG. 4 is an embodiment of the electrical junction box positioning tool 100 having a stud locator 150 that can be attached to the marking mechanis 120 by any convenient means, and the tool support beam 100 length is adjustable to be either longer or shorter by means of an extendable or telescoping leg 111. The stud locator can be attached the marking mechanism or to the beam 110 using any appropriate connection mechanism, and the position of the stud locator can be offset in a lateral direction with respect to the position of the marking mechanism so that a box mark can be made in the proper location next to a stud. The locator 150 can be attached to the beam or to the marking mechanism 120 by rivets, screws, bolts, glue, or Velcro for example. It is only necessary that the stud locator be attached to the marking mechanism (or the beam) so that when using the tool 100, the locator 150 is proximate to or touching the finished wall. The stud locator or finder can be electronic or a magnetic type locator, or the stud locator can comprise one or more magnets (which can be integral to the marking mechanism) that are attracted to screws that secure a wall covering to a stud, and the type of stud finder used can depend upon cost or other use considerations. For example, if a building is constructed primarily with wooden studs, then an electronic stud finder may be appropriate, or if the studs are steel, then a magnetic stud finder may be a better choice. The locator 150 has a display 151 and a stud center line indicator arrow 152 or some other means by which the tool operator can determine that the locator has detected the center line or axis of a stud. According this this embodiment, and assuming that the stud dimensions are 2×4 (the shorter dimension of a finished stud is actually 1.5 inches), the spatial relationship between the marking mechanism and the stud locator is such that when the center axis of a stud is located, the tool operator merely has to depress the mechanism 120 to mark a junction box location. The support beam can be designed to be telescoping by any convenient means that permits the beam length to be secure during tool operation. According to this embodiment, the tool operator can very quickly and accurately move the tool 100 along a finished wall to locate and mark multiple junction box locations.

Figure 5:
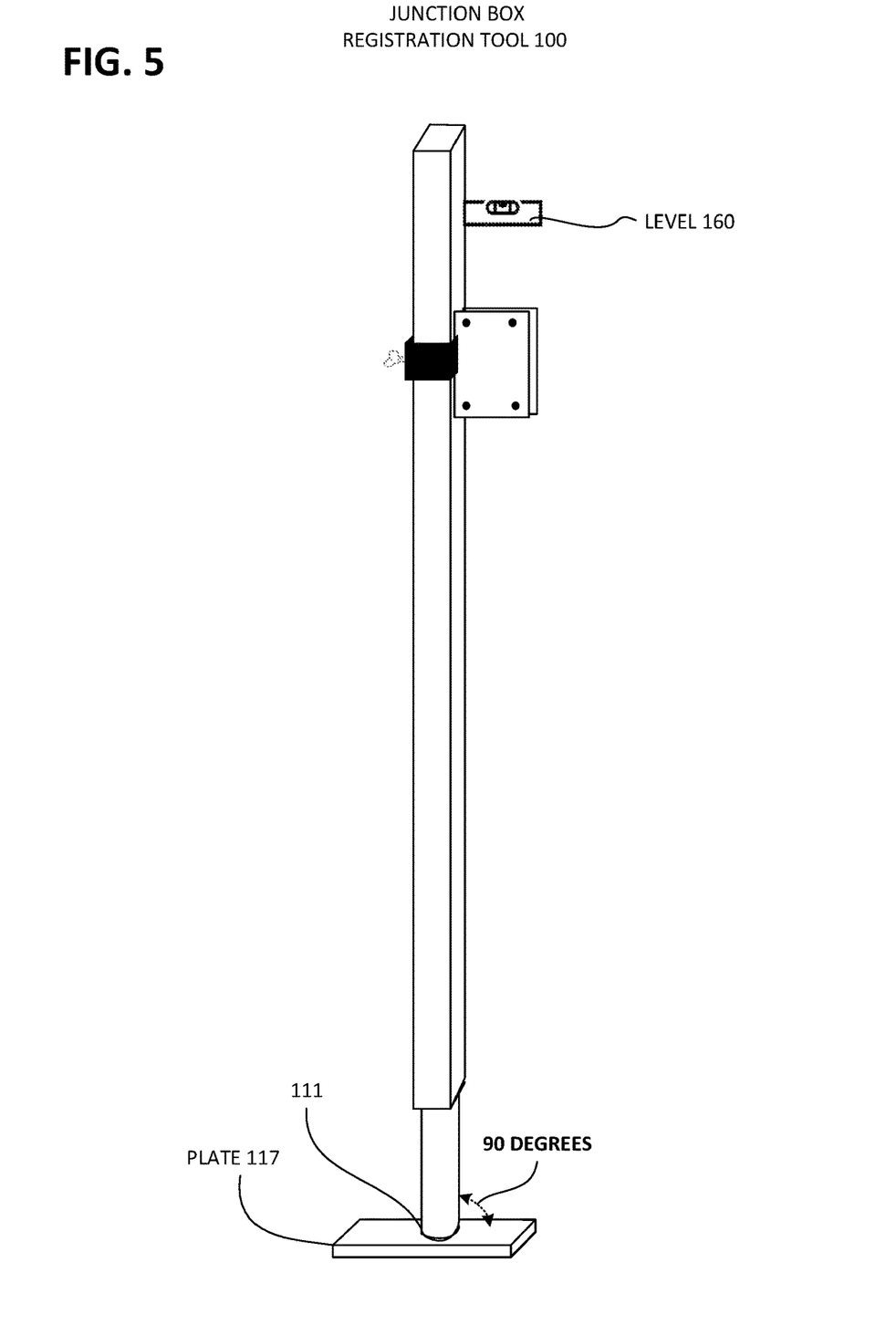
FIG. 5 shows the tool of FIG. 1 having an adjustable leg with attached bottom plate.

FIG. 5 is an embodiment of the tool 100 described earlier having an optional plate 117 attached to the proximal end 111 of the beam 110, and/or having a level detector 160 attached to the distal end 112 of the beam. The level detector can be attached by any convenient means to any point along the length of the beam 110 as long as it does not interfere with the marking mechanism movement. The plate 117 can be securely and rigidly attached to the proximal end of the beam by any appropriate means and the angle between any point from the top of the plate 117 to the surface of the beam 110 is ninety degrees. Either or both of the plate or level detector can be used to ensure that the orientation of the junction box markings are correct with respect to a stud to which a junction box is to be attached.

Figure 6A:
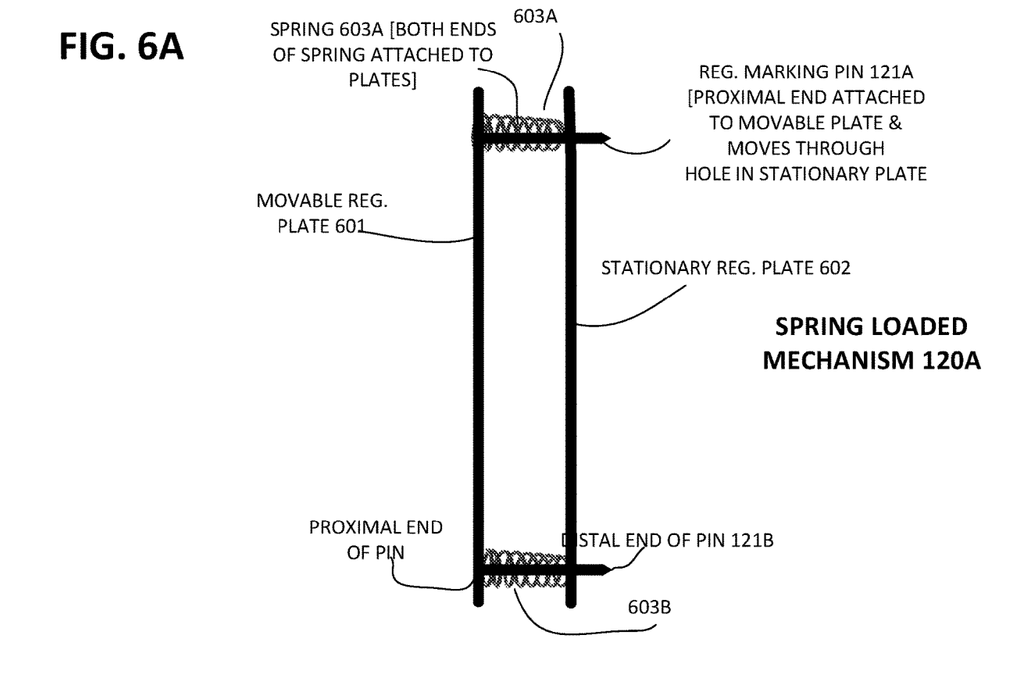
FIG. 6A is a diagram illustrating elements comprising a spring-loaded junction box location marking device.
Figure 6B:
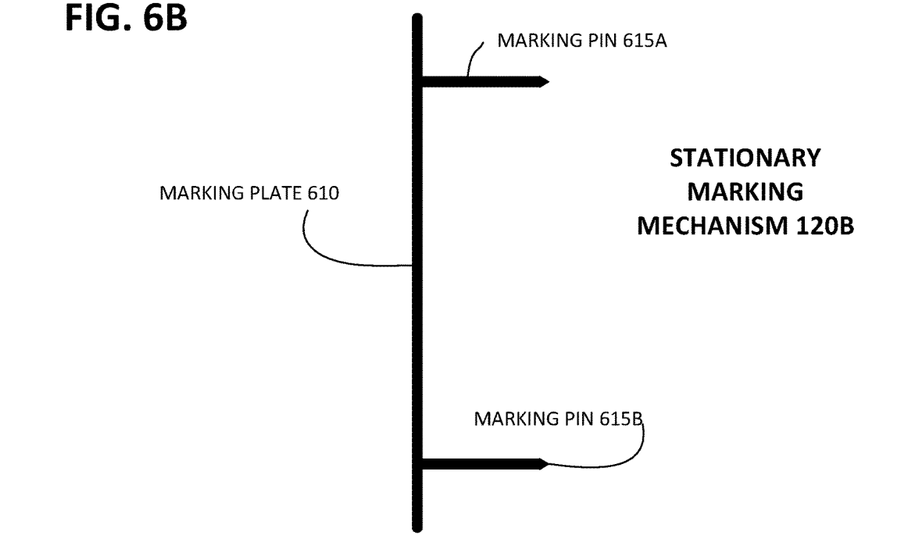
FIG. 6B is a diagram illustrating an embodiment of junction fox location marking device.

FIGS. 6A and 6B illustrate elements comprising two different, non-limiting, embodiments of the marking mechanism 120 described with reference to FIGS. 1 and 2. FIG. 6A is a side view showing elements comprising one embodiment of the marking mechanism 120. The marking mechanism has a movable plate 601 to which are fixedly attached four marking pins, 121A-121D (pins 121C and 121D are not shown in this view), springs 603A and 603B which encircle the corresponding marking pins and which are attached to the movable plate 601 at their proximal ends and which are attached to a stationary plate 602 at their distal ends. The marking pins move freely through holes (not shown) in the stationary plate 602. The stationary plate comprising the marking mechanism 120 is fixedly attached to the bracket 140 as described earlier with reference to FIG. 1. As previously described, when the tool 100 is correctly located in a position proximate to a wall stud, the movable plate 601 can be depressed, and the marking pins make a depression on the wall that can be used as a guide when mounting a junction box.

FIG. 6B illustrates another embodiment of the marking mechanism 201 that performs the same functionality (making junction box mounting guide marks) as the embodiment in FIG. 6A, but this embodiment does not have any moving parts.

Figure 7:
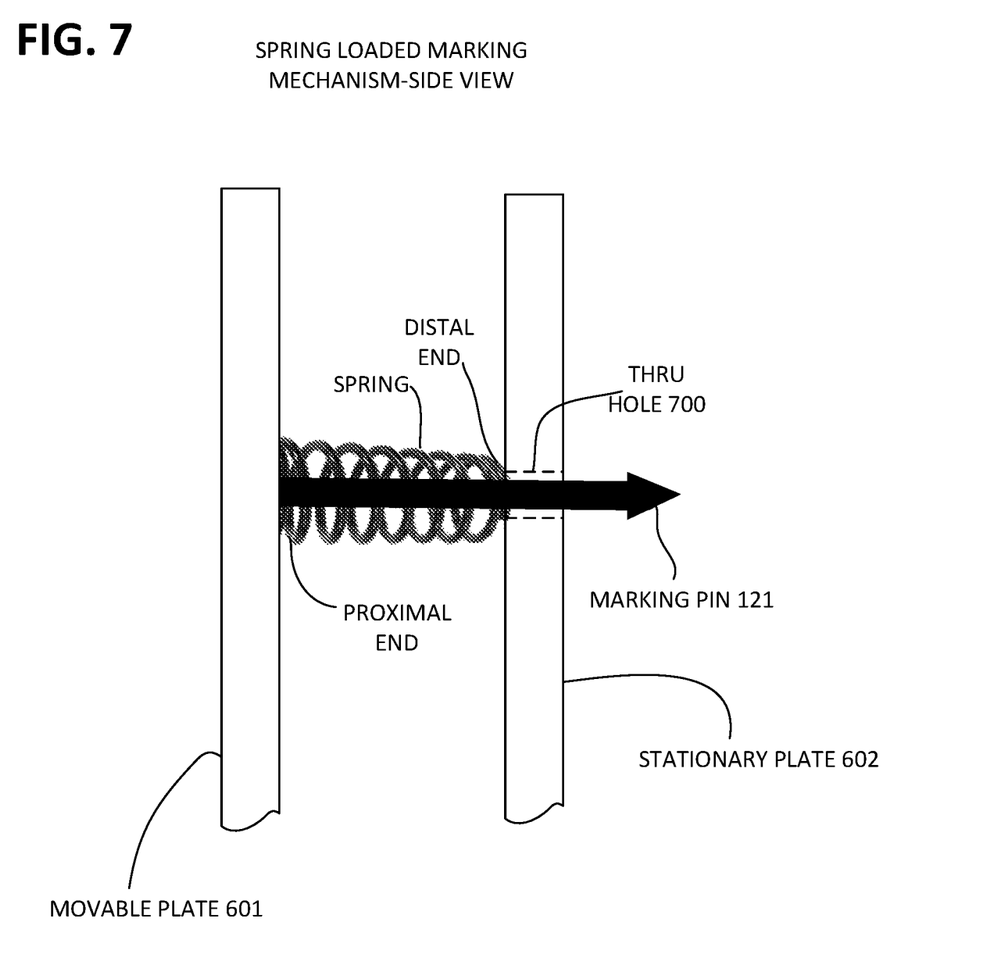
FIG. 7 shows the spring-loaded marking mechanism of FIG. 6A in greater detail.

FIG. 7 is a side view of the marking mechanism 120 in FIG. 6A showing a marking pin, spring and plate arrangement in more detail. Specifically, this view shows the marking pin 121 attached to the movable plate 601 disposed inside the spring and protruding through the thru-hole 700. It should be understood that while the embodiments shown in the Figures and described herein illustrate the marking pin disposed within a spring, this does not have to be the arrangement, as the pin can be disposed outside the spring as well.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A tool for marking a position on a finished wall surface for the installation of an electrical junction box, comprising:
    a fixed or variable length support beam having a proximal end that rests upon a flat surface and having an opposing distal end; and
    a marking mechanism, attached to the support beam by a mounting bracket;
    wherein the marking mechanism comprises:
        a stationary registration plate having at least four through holes and being attached to an opposing movable registration plate by at least four springs;
        wherein the movable registration plate has at least four marking pins attached to it, each one of which is disposed inside one of the springs, and each marking pin is registered with one of the stationary registration plate through holes; and
    the electrical junction box installation position on the finished wall is marked by moving the stationary registration plate into contact with the finished wall surface, the operator depressing the movable registration plate from a first position to a second position in which the springs are compressed and the marking pins travel into the through holes and come into contact with and puncture the finished wall surface, and the movable registration plate returning to the first position in which the marking pins are withdrawn from contact with the finished wall surface when the operator releases the movable registration plate.

2. The tool of claim 1, wherein the flat surface is a floor surface.

3. The tool of claim 1, wherein the position of the mounting bracket and the marking mechanism to which it is attached is movable along the length of the support beam towards or away from the proximal end.

4. The tool of claim 1, wherein a surface of the support beam has a plurality of ruled markings.

5. The tool of claim 4, wherein the plurality of the ruled markings represent distances from the proximal end of the support beam to a current position of the marking mechanism along the length of the support beam.

6. The tool of claim 1, further comprising a leg connected to and extending from the proximal end of the support beam that when extended or retracted adjusts the support beam to be longer or shorter.

7. The tool of claim 6, wherein the leg retracts into or extends from within the proximal end of the support beam.

8. The tool of claim 1, further comprising a flat plate being attached to the proximal end of the support beam at an angle that is ninety degrees to an axis running the length of the support beam.

9. The tool of claim 8, wherein the flat plate rests on a floor surface.

10. The tool of claim 1, wherein a wall stud locator device is attached to the tool.

11. The tool of claim 10, wherein the stud locator is attached to the support beam or to the marking mechanism.

12. The tool of claim 10, wherein the wall stud locator is an electronic device, a magnetic device or one or more magnets.

13. The tool of claim 1, wherein a level indicator device is attached to the support beam.

* * * * *